US011860580B2

(12) United States Patent
Furusato

(10) Patent No.: US 11,860,580 B2
(45) Date of Patent: Jan. 2, 2024

(54) WATCH COMPONENT AND WATCH

(71) Applicant: Seiko Epson Corporation, Tokyo (JP)

(72) Inventor: Daiki Furusato, Ina (JP)

(73) Assignee: SEIKO EPSON CORPORATION

( * ) Notice: Subject to any disclaimer, the term of this patent is extended or adjusted under 35 U.S.C. 154(b) by 848 days.

(21) Appl. No.: 16/922,042

(22) Filed: Jul. 7, 2020

(65) Prior Publication Data

US 2021/0011434 A1 Jan. 14, 2021

(30) Foreign Application Priority Data

Jul. 8, 2019 (JP) ................................ 2019-126820

(51) Int. Cl.
*G04B 37/22* (2006.01)
*G04B 19/10* (2006.01)
*G04B 19/12* (2006.01)
*G04B 45/00* (2006.01)
*G04B 19/06* (2006.01)

(52) U.S. Cl.
CPC .......... *G04B 37/226* (2013.01); *G04B 19/06* (2013.01); *G04B 19/10* (2013.01); *G04B 19/12* (2013.01); *G04B 45/0076* (2013.01)

(58) Field of Classification Search
CPC ...... G04B 19/10; G04B 19/12; G04B 37/226; G04B 45/0076; G04B 19/06
See application file for complete search history.

(56) References Cited

U.S. PATENT DOCUMENTS 5,178,725 A * 1/1993 Takeno .................. B23K 15/08 216/101
5,912,064 A * 6/1999 Azuma .................. G04C 10/02 136/251
2004/0032797 A1* 2/2004 Sato ....................... G04B 19/12 368/232
2009/0129210 A1 5/2009 Yamaguchi et al.
2011/0259753 A1* 10/2011 Grossenbacher ...... C25D 5/627 205/162
2013/0051196 A1* 2/2013 Takasawa ............. G04B 19/06 368/234
2016/0357156 A1* 12/2016 Kanno ................... G04G 17/08
2017/0038734 A1* 2/2017 Issartel ............. B23K 26/0624
2018/0122964 A1 5/2018 Adachi et al.
2019/0184794 A1 6/2019 Kameoka

FOREIGN PATENT DOCUMENTS

CN 107710419 A 2/2018
CN 109927470 A 6/2019
JP H11-326549 A 11/1999
JP 2003240871 A * 8/2003
JP 2003-287580 A 10/2003
JP 2005-249720 A 9/2005
JP 2010-216898 A 9/2010

OTHER PUBLICATIONS

Machine Translation of JP 2003-240871 (Year: 2003).*

* cited by examiner

*Primary Examiner* — Edwin A. Leon
*Assistant Examiner* — Jason M Collins
(74) *Attorney, Agent, or Firm* — Harness, Dickey & Pierce, P.L.C.

(57) ABSTRACT

A watch component is provided with a base material having light transmissivity, and a metal film layered on the base material. The metal film includes a plurality of through holes formed penetrating the metal film, and recessed portions are formed in the base material in positions corresponding to the through holes.

10 Claims, 9 Drawing Sheets

| | TEST CONDITION | | | | TEST RESULT | | |
|---|---|---|---|---|---|---|---|
| | MANUFACTURING PROCESS | PROTRUSION HEIGHT (μm) | RECESSED PORTION DEPTH (μm) | BOTTOM SURFACE ROUGHNESS (μm) | OPENING RATIO (%) | INTERFERENCE FRINGE REDUCTION EFFECT | PANEL TRANSMITTANCE REDUCTION EFFECT |
| EXAMPLE 1 | LASER PROCESSING | 35 | 250 | 0.01 TO 0.30 | 24.0% | A | B |
| EXAMPLE 2 | ION MILLING | - | 250 | 0.01 TO 0.30 | 24.0% | B | B |
| EXAMPLE 3 | BLASTING | 7.5 | 250 | 0.30 TO 0.50 | 23.4% | A | A |
| COMPARATIVE EXAMPLE | ETCHING | - | - | - | 24.0% | - | - |

FIG. 9

WATCH COMPONENT AND WATCH

The present application is based on, and claims priority from JP Application Serial Number 2019-126820, filed Jul. 8, 2019, the disclosure of which is hereby incorporated by reference herein in its entirety.

BACKGROUND

1. Technical Field

The present disclosure relates to a watch component and a watch.

2. Related Art

JP-A-11-326549 discloses a dial in which a first metal film and a second metal film are layered on a transparent substrate.

In JP-A-11-326549, a section in which a large number of small holes are arranged, and a plurality of island-shaped sections in which the small holes are not arranged are formed in the first metal film, and the second metal film is layered so as to configure time characters and the like on the plurality of island-shaped sections, thus obtaining a high quality feel.

However, in JP-A-11-326549, in the section where the large number of small holes are arranged, there is interference between reflected light reflected at opening ends of the small holes, and a stripe pattern becomes more easily seen. As a result, there is a problem in that the appearance deteriorates, and the high quality feel is hard to obtain.

SUMMARY

A watch component of the present disclosure includes a base material having light-transmissivity and including a plurality of recessed portions, and a metal film layered at the base material and including a plurality of through holes provided in positions corresponding to the plurality of recessed portions.

In the watch component of the present disclosure, a bottom surface of the recessed portion may be formed in a curved surface shape.

In the watch component of the present disclosure, the bottom surface of the recessed portion may be a rough surface.

In the watch component of the present disclosure, the recessed portion may be formed such that with the bottom surface thereof is a rough surface having an arithmetic average roughness Ra that is greater than 0.01 μm and less than 0.5 μm.

The watch component of the present disclosure may include a a convex portion provided along an opening end portion of the through hole and protruding in a film thickness direction of the metal film.

A watch of the present disclosure includes a case, a watch component that is disposed inside the case and that includes a base material having light-transmissivity and including a plurality of recessed portions and a metal film layered at the base material and provided with a plurality of through holes provided in positions corresponding to the plurality of recessed portions, and a solar cell which is disposed inside the case on an opposite side of the base material from a surface having the metal film layered thereon, and at which light passing through the plurality of recessed portions and the plurality of through holes is incident.

BRIEF DESCRIPTION OF THE DRAWINGS

FIG. 9 is a table showing results of evaluation tests of each of examples and the comparative example.

DESCRIPTION OF EXEMPLARY EMBODIMENTS

First Embodiment

A watch 1 according to a first embodiment of the present disclosure will be described below with reference to the drawings.

Figure 1:
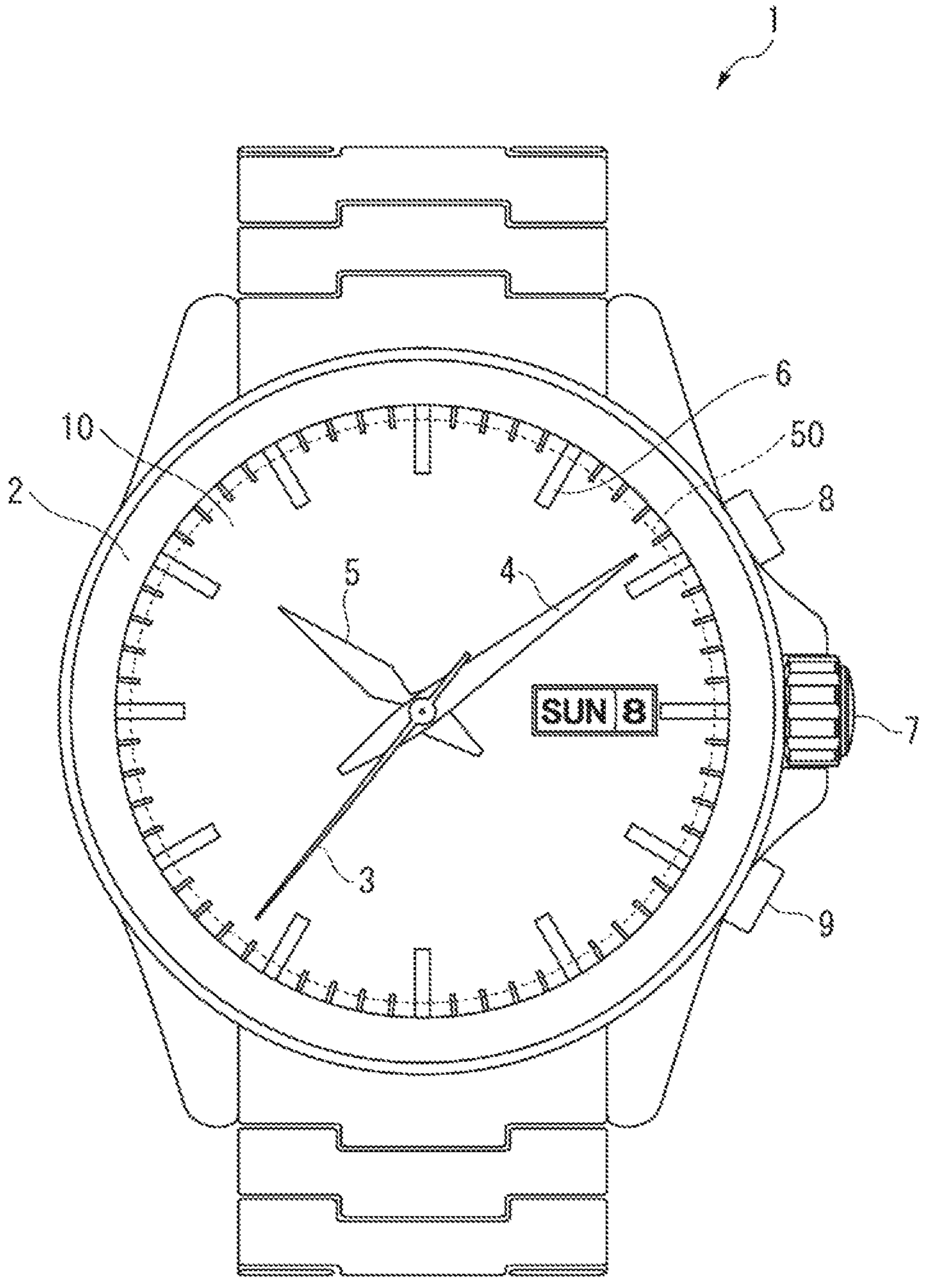
FIG. 1 is a front view illustrating an overall configuration of a watch according to a first embodiment.

FIG. 1 is a front view illustrating the watch 1. In this embodiment, the watch 1 is configured as a wristwatch that is worn on a user's wrist. A side contacting the wrist when the watch 1 is worn on the wrist is referred to as the back side of the watch 1, and the side opposite to the back side is described as the front side of the watch 1.

As illustrated in FIG. 1, the watch 1 is provided with a metal outer case 2. Further, the outer case 2 is provided with a disk-shaped dial 10, a second hand 3, a minute hand 4, an hour hand 5, a crown 7, an A button 8, and a B button 9. Note that the outer case 2 is an example of a case of the present disclosure.

The dial 10 is provided with hour marks 6 for indicating the time. Further, a solar cell 50, a movement (not illustrated), and the like are provided on the back side of the dial 10. That is, the watch 1 according to the present embodiment is configured as a solar watch.

Dial

Figure 2:
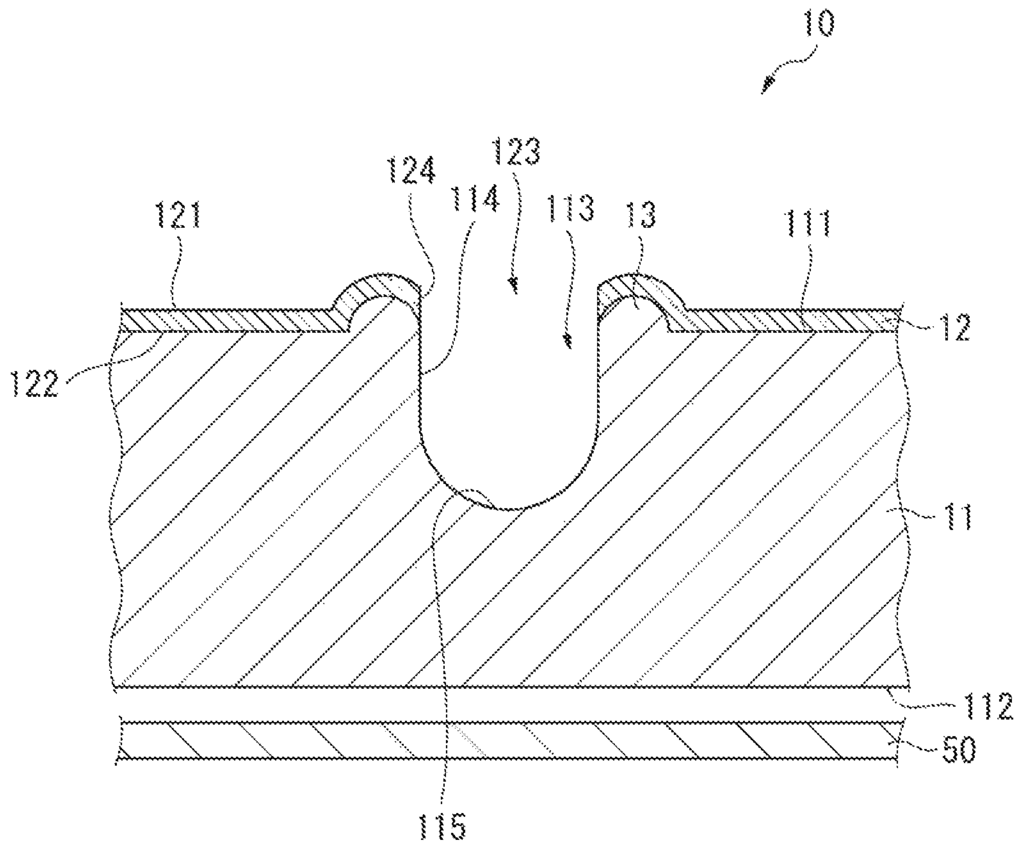
FIG. 2 is an enlarged cross-sectional view illustrating an overview of a dial according to the first embodiment.

FIG. 2 is an enlarged cross-sectional view illustrating main portions of the dial 10.

As illustrated in FIG. 2, the dial 10 includes a substrate 11, which is a base material, and a metal film 12. Further, convex portions 13, which will be described later, are formed on the dial 10. Note that the dial 10 is an example of a watch component of the present disclosure.

Substrate

The substrate 11 is formed from a resin material, such as polycarbonate, for example, and is light-transmissive. Note that in the present disclosure, "light-transmissive" refers to having a property of transmitting at least some of light in a wavelength region that can be generated by a solar panel of the solar cell 50.

Also, the substrate 11 has a first face 111 formed on a circular disk and disposed on the front side of the watch 1, and a second face 112 disposed on the back side of the watch 1. Further, a plurality of recessed portions 113, to be described below, are provided in the substrate 11. Note that, as will be described below, the metal film 12 is layered on the first surface 111 of the substrate 11. Then, the solar cell 50 is disposed on the second surface 112 side of the substrate 11. In other words, the solar cell 50 is disposed on the second side 112 side, which is the surface of the substrate 11 opposite to the first surface 111 on which the metal film 12 is disposed.

In the present embodiment, an average thickness of the substrate 11 is not particularly limited, but is preferably from 300 μm to 1000 μm.

Note that the substrate 11 is not limited to the configuration described above, and may be formed from various types of glass material, a monocrystalline alumina such as sapphire, and the like, or may be formed from a material that is light-transmissive.

Metal Film

The metal film 12 is formed from various types of metal material and is layered on the first surface 111 of the substrate 11. Further, the metal film 12 includes a front surface 121 disposed on the front side of the watch 1, and a back surface 122 disposed on the substrate 11 side. In other words, the back surface 122 is disposed facing or in contact with the first surface 111 of the substrate 11.

Examples of the metal material configuring the metal film 12 include Ag, Pt, Pd, Au, Cu, Al, Cr, Sn, Fe, Ti, and the like, or alloys thereof. Further, the metal film 12 may be configured by layering a plurality of metal films made of these materials. Furthermore, the metal film 12 may be configured by layering a metal film made of the metals described above, a metal oxide film, a metal nitride film, a metal carbide film, an inorganic oxide film, or the like, or may be formed from a metal oxide film, a metal nitride film, a metal carbide film, or the like. In the present embodiment, the metal film 12 is configured by layering an Ag layer having a thickness of 150 nm and an $SiO_2$ layer having a thickness of 100 nm.

A plurality of circular through-holes 123 are formed in the metal film 12. The through-holes 123 penetrate from the front surface 121 to the back surface 122 of the metal film 12, and are provided to provide a desired light transmittance in the dial 10. In other words, in the dial 10, light incident from the front side of the watch 1 is transmitted to the back surface 122 side of the metal film 12 via the plurality of through holes 123.

Note that an average diameter of the through-hole 123 is not particularly limited, but is preferably from 1 μm to 50 μm. Configuring the through holes 123 as described above can inhibit the solar cell 50 disposed on the back side of the dial 10 from being seen when the watch 1 is viewed from the front side, while maintaining the desired light transmittance, and it is possible to prevent a deterioration in appearance.

Further, the through hole 123 is not limited to being formed in a circular shape, and for example, may be formed in a lattice shape in the metal film 12. In other words, the shape of the through-hole 123 in plan view when viewed from the film thickness direction of the metal film 12 is not limited, as long as, in a cross-section in the thickness direction of the dial 10, the through hole 123 or an opening, which is a space penetrating the metal film 12 as illustrated in FIG. 2, and the recessed portions 113 formed in the substrate 11 are provided.

Recessed Portion

The plurality of recessed portions 113 of the substrate 11 are provided in positions corresponding to the plurality of through holes 123 of the metal film 12. The recessed portion 113 includes side surfaces 114 and a bottom surface 115 formed continuously from the side surfaces 114. In the present embodiment, the recessed portions 113 are formed so that side surfaces of the through holes 123 and the side surfaces 114 of the recessed portions 113 are flush with each other.

In the present embodiment, the depth of the recessed portion 113 is not particularly limited, but is preferably from 5% to 50% of the thickness of the substrate 11.

Further, in the present embodiment, the bottom surface 115 of the recessed portion 113 is formed in a curved surface shape. Furthermore, the bottom surface 115 is formed to be a rough surface. Specifically, the bottom surface 115 is formed to be a rough surface for which an arithmetic average roughness Ra is greater than 0.01 μm and less than 0.3 μm. Note that in the present embodiment, the arithmetic average roughness Ra conforms to "JIS B 0601".

In this way, the bottom surface 115 is formed in the curved surface shape and is formed to be a rough surface, and as a result, much of the light that is incident from the front side of the watch 1 and passes through the through holes 123 is scattered by the bottom surface 115. In other words, the bottom surface 115 functions as a scattering portion.

Convex Portion

The convex portion 13 is provided along an opening end portion 124 of the through hole 123 of the metal film 12. The convex portion 13 is provided by causing the metal film 12 and the substrate 11 to protrude in a direction from the back side to the front side of the watch 1, that is, in the film thickness direction of the metal film 12.

A protrusion height of the convex portion 13 is not particularly limited, but is preferably from 30 μm to 40 μm. As a result, at the opening end portion 124 of the through hole 123, that is, at a boundary portion of the through-hole 123, the light incident from the front side of the watch 1 is scattered by the convex portion 13. As a result, the convex portion 13 functions as a scattering portion.

Manufacturing Method for Dial

Next, a manufacturing method for the dial 10 according to the present embodiment will be described with reference to a flowchart in FIG. 3. Note that, in the present embodiment, a method for manufacturing a plurality of the dials 10 will be described.

Figure 3:
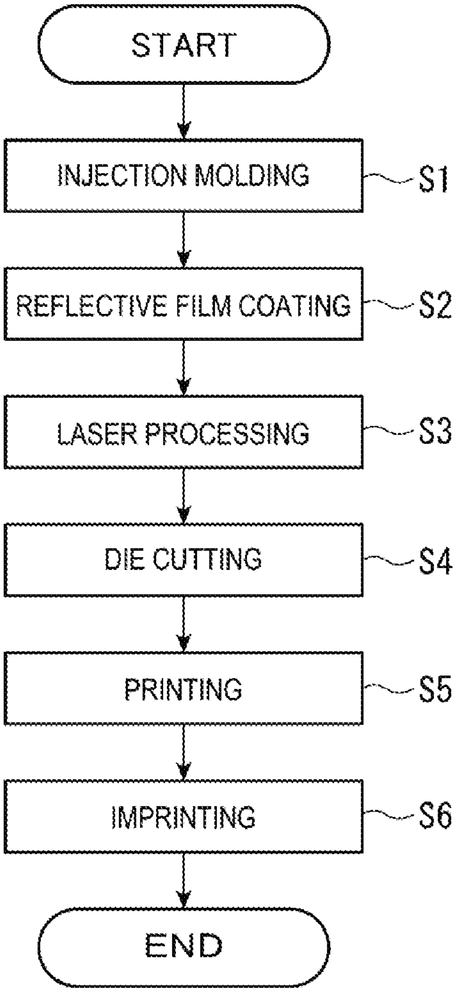
FIG. 3 is a flowchart describing a manufacturing method for the dial according to the first embodiment.

As illustrated in FIG. 3, first, at step S1, the substrate 11 is formed by injection molding a resin material.

Note that the substrate 11 is not limited to being formed by injection molding.

For example, the substrate 11 may be formed by compression molding, extrusion molding, or the like.

Next, at step S2, the metal film 12 is layered on the first surface 111 of the substrate 11 by sputtering. Note that the metal film 12 is not limited to being layered by sputtering, and may be layered by vacuum deposition, ion plating, ion-assisted deposition, or the like, for example.

Next, at step S3, laser machining is performed. Specifically, an arrangement of the through holes 123 necessary to achieve the desired light transmittance is determined in advance, and the laser is irradiated from the surface 121 side of the metal film 12 in accordance with the required arrangement of the through holes 123. As a result, the metal film 12 is drilled by the laser at positions corresponding to the through holes 123, and thus, the through holes 123 are formed at the desired positions. At this time, a power output of the laser is adjusted so that the substrate 11 can also be drilled to a desired depth, as well as the metal film 12. As a result, the recessed portions 113 having a predetermined depth are formed at positions corresponding to the through holes 123 of the substrate 11. At this time, as described above, the bottom surfaces 115 of the recessed portions 113 are formed into the curved surface shape.

Further, when drilling the metal film 12 and the substrate 11 using the laser, the opening end portions 124 of the through holes 123 thermally expand due to the heat of the laser, and protrude in the film thickness direction of the metal film 12. As a result, the convex portions 13 are formed.

Next, die cutting is performed at step S4 to form the plurality of dials 10. Then, at step S5, a model number or the like is printed on the surface of the metal film 12 or the like. Finally, at step S6, the hour marks 6 and the like are imprinted.

Advantageous Effects of First Embodiment

According to the present embodiment as described above, the following advantageous effects can be obtained.

In the present embodiment, the dial 10 is provided with the light-transmissive substrate 11 and the metal film 12 layered on the first surface 111 of the substrate 11. Then, the plurality of through holes 123 penetrating the metal film 12 are formed in the metal film 12, and the recessed portions 113 are formed in the substrate 11 at positions corresponding to the through holes 123.

In this way, the light incident from the front side of the watch 1 reaches the recessed portion 113 of the substrate 11 via the through hole 123 of the metal film 12, and is scattered by the recessed portion 113. As a result, the interference of the reflected light can be suppressed compared to a case in which the recessed portion 113 is not provided in the substrate 11, and the incident light is reflected by the first surface 111 of the substrate 11. Therefore, an appearance of a stripe pattern caused by the interference of the reflected light can be suppressed, that is, it is possible to prevent glare. Thus, it is possible to prevent the deterioration in the appearance of the watch 1.

In the present embodiment, the bottom surface 115 of the recessed portion 113 is formed as the curved surface.

As a result, the bottom surface 115 functions as the scattering portion that scatters the incident light, and thus, the interference of the reflected light can be suppressed.

In the present embodiment, the bottom surface 115 of the recessed portion 113 is formed to be the rough surface. Specifically, the bottom surface 115 is formed to be a rough surface for which an arithmetic average roughness Ra is greater than 0.01 μm and less than 0.3 μm.

This makes the incident light more scattered, so the interference of the reflected light can be further suppressed.

In the present embodiment, the convex portions 13 protruding in the film thickness direction of the metal film 12 are provided on the dial 10 along the opening end portions 124 of the plurality of through holes 123.

As a result, the convex portion 13 functions as the scattering portion, and the interference of the reflected light of the light incident from the front side of the watch 1 can be suppressed at the boundary portion of the through hole 123.

In the present embodiment, the through holes 123 and the recessed portions 113 are formed by the laser machining in the manufacturing process of the dial 10. As a result, manufacturing costs of the dial 10 can be reduced because manufacturing processes can be reduced in comparison to a case in which the through holes 123 and the recessed portions 113 are formed in a typical etching process.

Second Embodiment

Next, a second embodiment of the present disclosure will be described below with reference to FIG. 4 and FIG. 5. The second embodiment differs from the first embodiment described above in that recessed portions 113A are formed by ion milling.

Note that, in the second embodiment, the same or similar components as or to those of the first embodiment will be assigned the same reference signs and a description thereof will be omitted or simplified.

Figure 4:
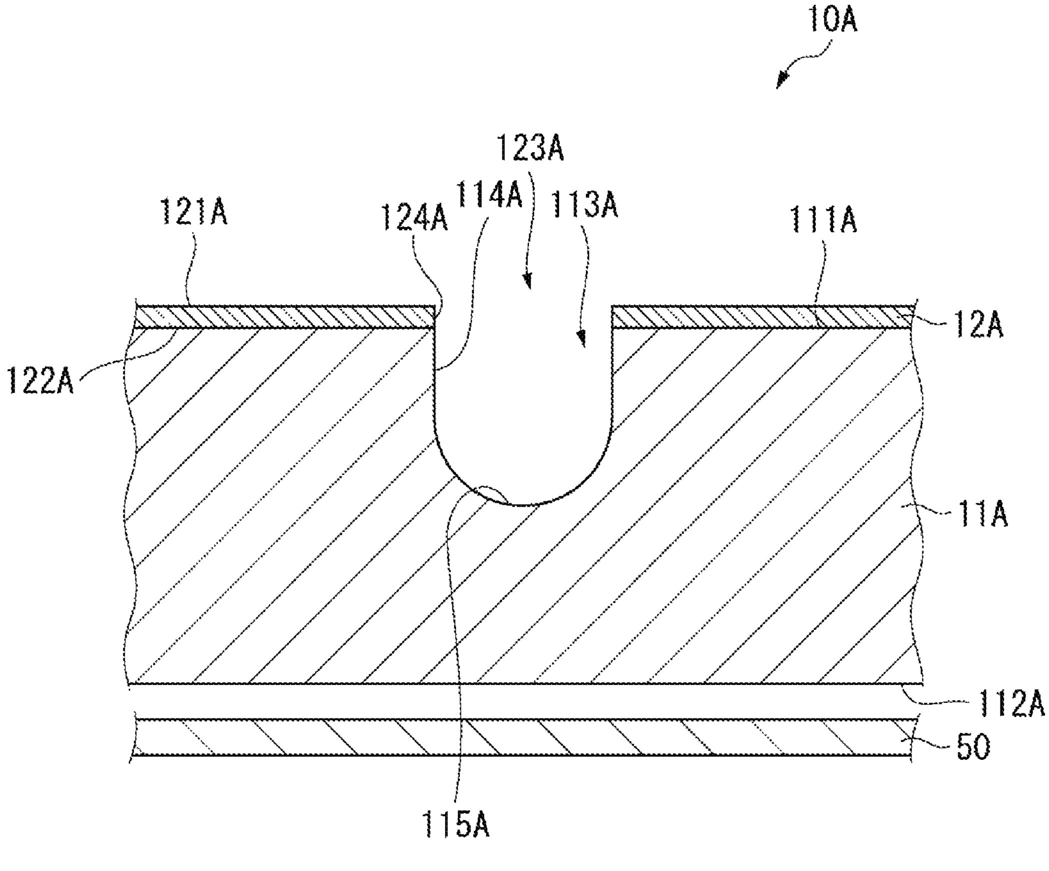
FIG. 4 is an enlarged cross-sectional view illustrating an overview of a dial according to a second embodiment.

FIG. 4 is an enlarged cross-sectional view illustrating main portions of a dial 10A according to the second embodiment.

As illustrated in FIG. 4, the dial 10A of the present embodiment is provided with a substrate 11A and a metal film 12A layered on a first surface 111A of the substrate 11A. Note that convex portions such as those of the first embodiment described above are not formed on the dial 10A of the present embodiment.

The substrate 11A is configured in a similar manner to the substrate 11 of the first embodiment described above, and is provided with the first surface 111A, and a second surface 112A. The recessed portions 113A are provided at positions corresponding to through holes 123A of the metal film 12A. The recessed portion 113A includes a side surface 114A and a bottom surface 115A, and the bottom surface 115A is formed in a curved surface shape.

The metal film 12A is configured in a similar manner to the metal film 12 of the first embodiment described above, includes a front surface 121A and a rear surface 122A, and the plurality of through holes 123A are formed therein. In the present embodiment, the convex portions are not provided as described above, so opening end portions 124A of the through holes 123A do not protrude.

Manufacturing Method for Dial

Next, a manufacturing method for the dial 10A according to the present embodiment will be described using a flowchart in FIG. 5.

Note that in the present embodiment, steps S1A, S2A, and S4A to S6A are the same as the steps S1, S2, and S4 to S6 of the first embodiment described above, and descriptions thereof will thus be omitted here.

Figure 5:
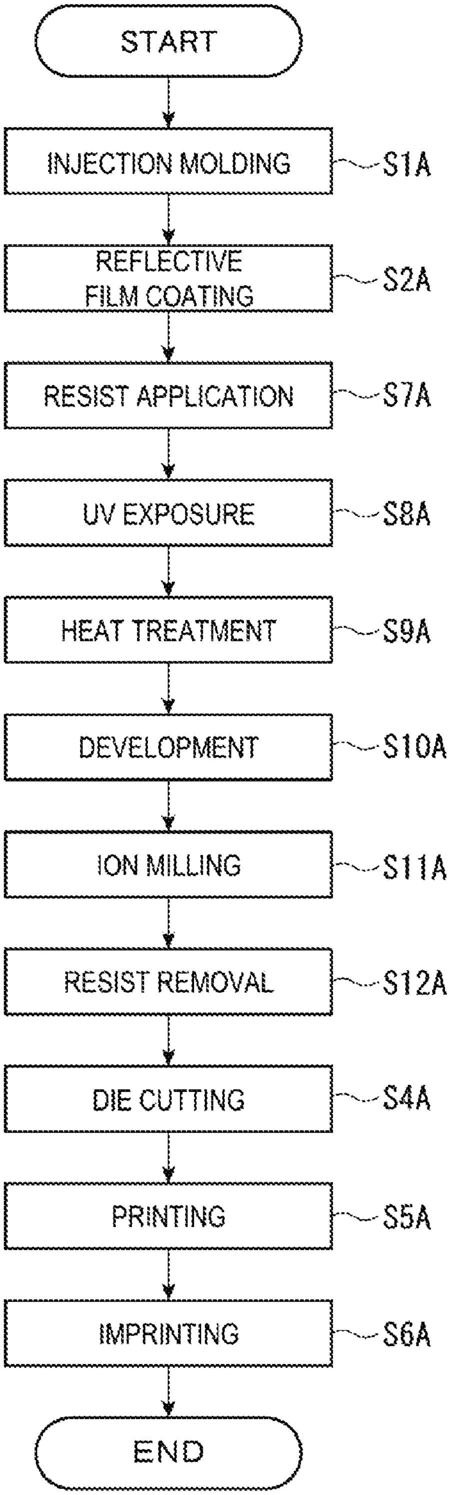
FIG. 5 is a flowchart describing a manufacturing method for the dial according to the second embodiment.

As illustrated in FIG. 5, at step S7A, a resist is applied to the surface 121A of the metal film 12A. Specifically, a photoresist is applied by spin coating. Next, at step S8A, the resist is irradiated with ultraviolet light and subject to UV exposure. At this time, by using a photomask, exposure is performed so that a resist pattern is formed apart from the positions at which the through holes 123A are formed. Thereafter, at step S9A. heat treatment is performed using an atmospheric oven or the like, for example, and the resist pattern is developed at step S10A. The resist pattern is formed in this way.

Next, the ion milling is performed at step S11A. Specifically, the surface 121A of the metal film 12A is irradiated with an ion beam using the resist pattern as a mask. As a result, the through holes 123A are formed by irradiating the metal film 12A with the ion beam at positions not masked by the resist pattern.

Further, the substrate 11A is also irradiated with the ion beam via the through holes 123A. As a result, the recessed portions 113A having a predetermined depth are formed in positions corresponding to the through holes 123A of the substrate 11A. At this time, in a similar manner to the first embodiment described above, the bottom surface 115A of the recessed portion 113A is formed in the curved surface shape.

After that, at step S12A, the resist pattern is removed. Specifically, the resist pattern is peeled off by performing alkali treatment using caustic soda water or the like at a concentration of 2 to 5%, and then rinsing is performed using pure water or the like.

Advantageous Effects of Second Embodiment

According to the present embodiment as described above, the following advantageous effects can be obtained.

In the present embodiment, in a similar manner to the first embodiment described above, the recessed portions 113A are formed at the positions corresponding to the through holes 123A of the substrate 11A. The bottom surface 115A of the recessed portion 113A is formed in the curved surface shape.

As a result, the interference of the reflected light can be suppressed in the same manner as in the first embodiment described above. Therefore, the appearance of an iridescent stripe pattern caused by the interference of the reflected light can be suppressed, that is, it is possible to prevent glare. It is thus possible to prevent the deterioration in the appearance of the watch 1.

Third Embodiment

Next, a third embodiment of the present disclosure will be described with reference to FIG. 6 and FIG. 7. The third embodiment differs from the first and second embodiments described above in that recessed portions 113B are formed by blasting.

Note that, in the third embodiment, the same or similar components as or to those of the first and second embodiments will be assigned the same reference signs and a description thereof will be omitted or simplified.

Figure 6:
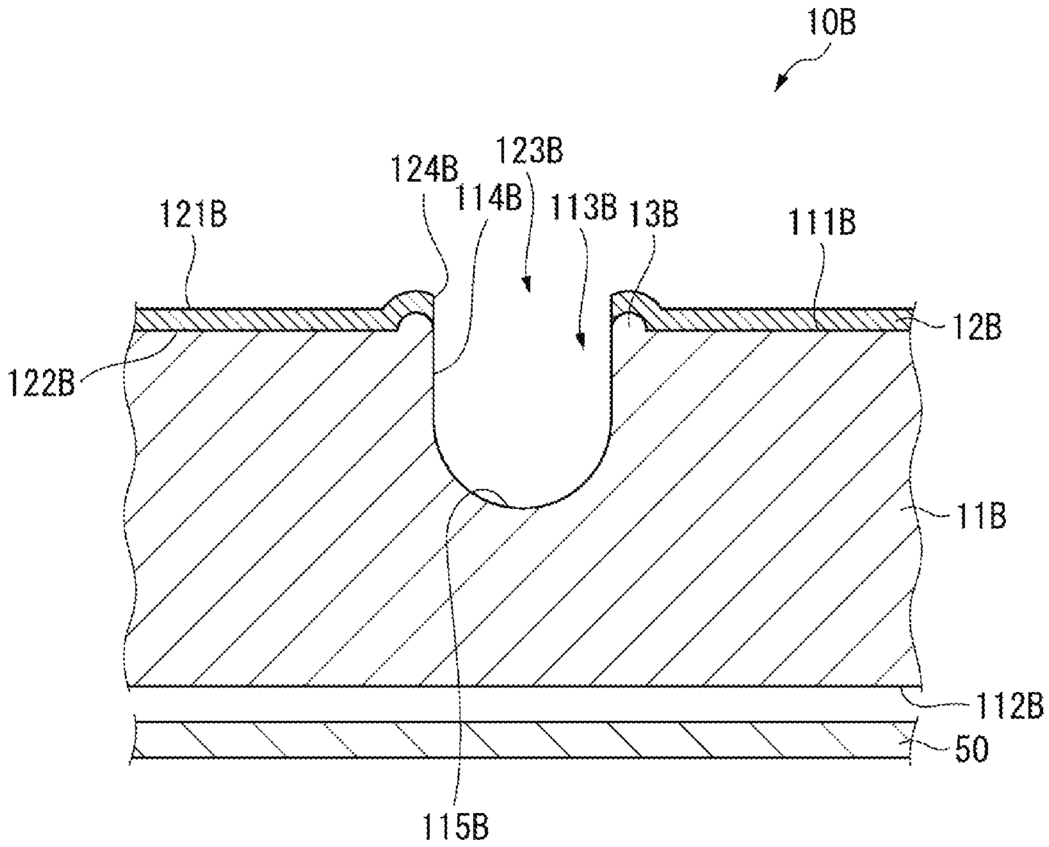
FIG. 6 is an enlarged cross-sectional view illustrating an overview of a dial according to a third embodiment.

FIG. 6 is an enlarged cross-sectional view illustrating main portions of a dial 10B according to the third embodiment.

As illustrated in FIG. 6, the dial 10B of the present embodiment is provided with a substrate 11B, a metal film 12B layered on a first surface 111B of the substrate 11B, and convex portions 13B.

The substrate 11B is configured in a similar manner to the substrate 11 of the first embodiment described above, and includes the first surface 111B and a second surface 112B, and the recessed portions 113B are provided at positions corresponding to through holes 123B of the metal film 12B. Then, the recessed portion 113B includes a side surface 114B and a bottom surface 115B, and the bottom surface 115B is formed in a curved surface shape.

In the present embodiment, although not illustrated, the recessed portion 113B is formed so that the arithmetic average roughness Ra of the bottom surface 115B is greater than that of the first embodiment described above. Specifically, the bottom surface 115B is formed to be a rough surface for which the arithmetic average roughness Ra is greater than 0.3 μm and less than 0.5 μm.

As a result, the bottom surface 115B functions as the scattering portion, in a similar manner to the first embodiment described above. Further, because the arithmetic average roughness Ra of the bottom surface 115B is large, the incident light is less likely to be reflected. In other words, since reflection loss can be suppressed, the transmittance of light incident through the through holes 123B increases.

The metal film 12B is configured in a similar manner to the metal film 12 of the first embodiment described above, includes a front surface 121B and a rear surface 122B, and the plurality of through holes 123B are formed therein.

As in the first embodiment described above, the convex portions 13B are provided along opening end portions 124B of the through holes 123B of the metal film 12B. In the present embodiment, the protrusion height of the convex portion 13B is not particularly limited, but is preferably from 5 μm to 10 μm.

Manufacturing Method for Dial

Next, a manufacturing method for the dial 10B according to the present embodiment will be described with reference to a flowchart in FIG. 7.

Note that in the present embodiment, steps S1B, S2B, and S4B to S6B are the same as steps S1, S2, and S4 to S6 of the first embodiment described above, and descriptions thereof will thus be omitted here.

Figure 7:
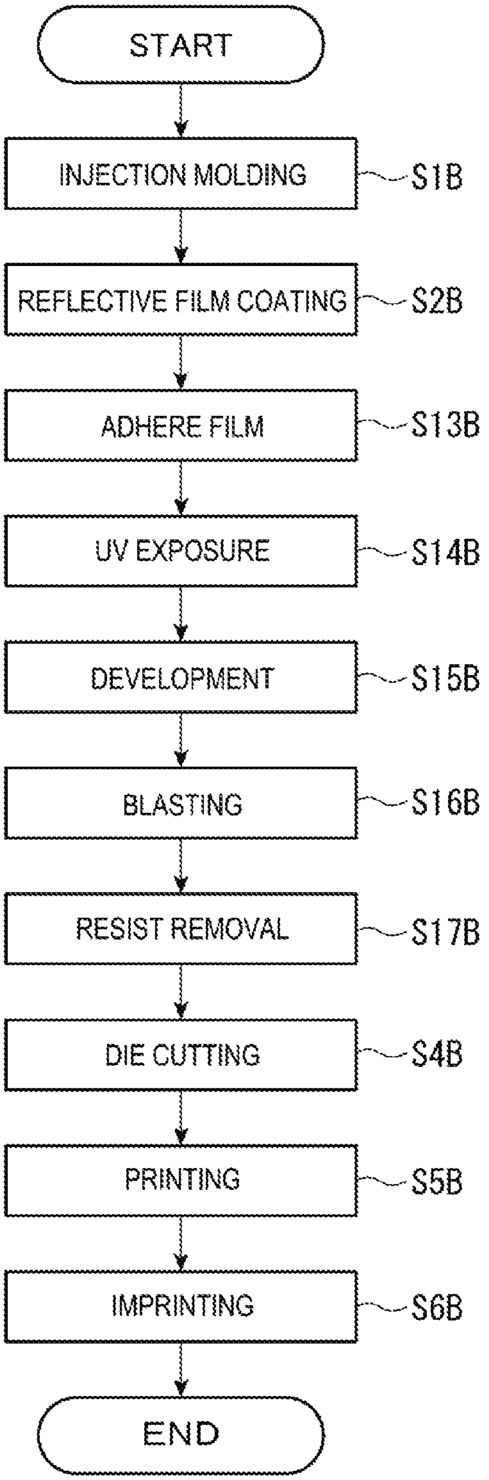
FIG. 7 is a flowchart describing a manufacturing method for the dial according to the third embodiment.

As illustrated in FIG. 7, at step S13B, a film for a mask is adhered to the surface 121B of the metal film 12B. For example, a dry film resist for sand blasting is used as the film. Next, at step S14B, the adhered film is irradiated with ultraviolet light and is subject to UV exposure. Then, the dry film resist is developed at step S15B. The resist pattern is formed in this way.

Next, at step S16B, blasting is performed. Specifically, fine sand is projected onto the surface 121B of the metal film 12B, with the resist pattern formed by the film as a mask. In this way, the through holes 123B are formed as a result of the fine sand being projected onto positions where there is no masking by the resist pattern of the metal film 12B.

At this time, the fine sand is also projected onto the substrate 11B via the through holes 123B. In this way, the recessed portions 113B having a predetermined depth are formed in positions corresponding to the through holes 123B of the substrate 11B. Here, in a similar manner to the first embodiment described above, the bottom surface 115B of the recessed portion 113B is formed in the curved surface shape. Further, in the present embodiment, since the recessed portion 113B is formed by blasting, the bottom surface 115B is scraped by the fine sand, and the arithmetic average roughness Ra of the bottom surface 115B is increased.

Furthermore, the opening end portion 124B of the through hole 123B is deformed due to an impact of collision with the fine sand, and protrudes in the film thickness direction of the metal film 12B. The convex portion 13B is formed in this way.

Note that, at this time, the film resist is also somewhat shaved due to collision with the fine sand. However, because the film resist is sufficiently thicker than the metal film 12B to be ground, and because a grinding rate is lower than that for the metal film 12B, the metal film 12B is not shaved at the locations where the metal film is masked with the resist pattern.

After that, the resist is removed at step S17B.

Advantageous Effects of Third Embodiment

According to the present embodiment as described above, the following advantageous effects can be obtained.

In the present embodiment, as in the first and second embodiments described above, the recessed portions 113B of the substrate 11B are formed in the positions corresponding to the through holes 123B penetrating the metal film 12B. Then, the bottom surface 115B of the recessed portion 113B is formed in the curved surface shape.

In this way, the interference of the reflected light can be suppressed in a similar manner as in the first and second embodiments described above. Therefore, the appearance of the stripe pattern caused by the interference of the reflected light can be suppressed, that is, it is possible to prevent glare. It is thus possible to prevent the deterioration in the appearance of the watch 1.

In the present embodiment, the bottom surface 115B is formed to be the rough surface for which the arithmetic average roughness Ra is greater than 0.3 μm and less than 0.5 μm.

As a result, the incident light can be further scattered, and the interference of the reflected light can be further suppressed. Further, since the reflection loss of the incident light can be suppressed, a transmitted amount of light incident through the through holes 123B can be increased.

In the present embodiment, the convex portion 13B protruding in the film thickness direction of the metal film 12B is provided along the opening end portion 124B of the through hole 123B.

In this way, in a similar manner to the first embodiment described above, the interference of the reflected light of the incident light at a boundary portion of the through hole 123B can be suppressed.

In the present embodiment, the through holes 123B and the recessed portions 113B are formed by blasting, in the manufacturing process of the dial 10B. Therefore, manufacturing costs of the dial 10B can be reduced because manufacturing processes can be reduced in comparison to a case in which the through holes 123B and the recessed portions 113B are formed in a typical etching process, for example.

Next, specific examples will be described.

Example 1

A dial was formed in accordance with the first embodiment described above. Specifically, the dial was formed by layering a metal film, through sputtering, on a polycarbonate substrate having a thickness of 500 μm and a diameter of 30 mm. The metal film was formed by layering an Ag layer having a thickness of 120 nm and an $SiO_2$ layer having a thickness of 100 nm.

Then, a plurality of through holes were formed in the metal film by laser machining. At this time, a number of the through holes required such that the transmittance of light became 30% was determined through pre-testing, and the determined number of through holes was formed. In addition, recessed portions having a depth of 250 μm were formed by laser machining in positions corresponding to the through holes of the substrate. Further, convex portions having a protrusion height of 35 μm were formed on opening end portions of the through holes.

Example 2

The dial was formed in accordance with the second embodiment described above. Specifically, a substrate and a metal film similar to Example 1 described above were prepared, and a plurality of through holes were formed in the metal film by ion milling. At this time, a number of the through holes required such that the transmittance of light became 30% was determined through pre-testing, and the determined number of through holes was formed. Further, recessed portions having a depth of 250 μm were formed by ion milling, in positions corresponding to the through holes of the substrate.

Example 3

The dial was formed in accordance with the third embodiment described above. Specifically, a substrate and a metal film similar to Example 1 and Example 2 described above were prepared, and a plurality of through holes were formed in the metal film by blasting. At this time, a number of the through holes required such that the transmittance of light became 30% was determined through pre-testing, and the determined number of through holes was formed. Further, recessed portions having a depth of 250 μm were formed by blasting, in positions corresponding to the through holes of the substrate. Furthermore, convex portions having a protrusion height of 7.5 μm were formed on opening end portions of the through holes.

COMPARATIVE EXAMPLE

Figure 8:
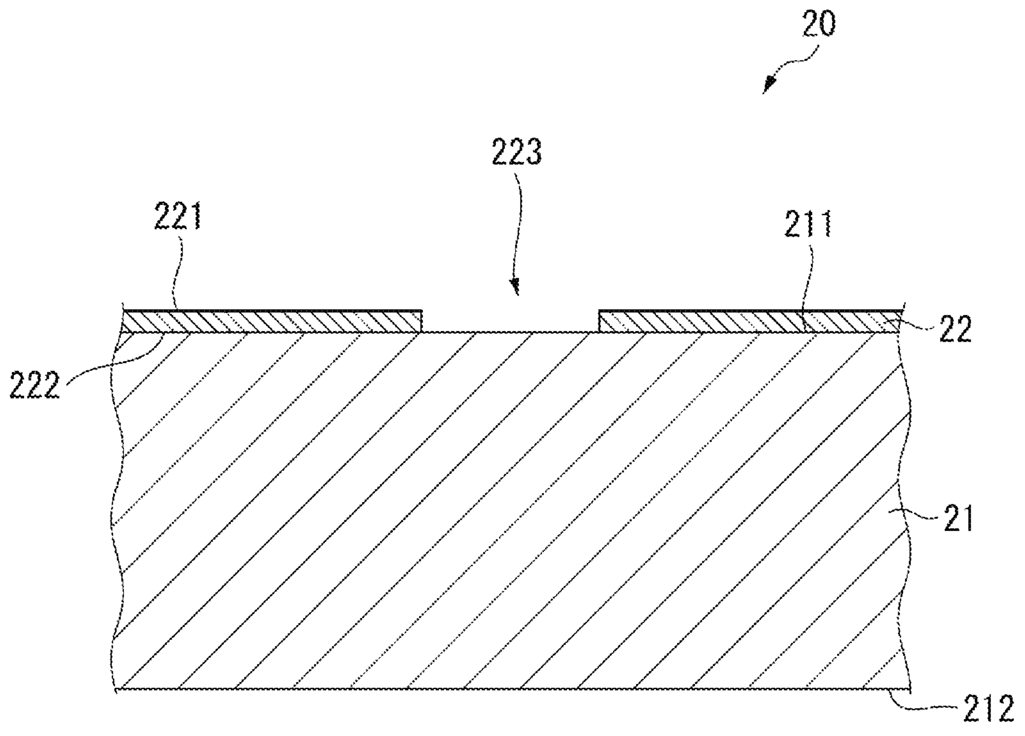
FIG. 8 is an enlarged cross-sectional view illustrating an overview of a dial of a comparative example.

FIG. 8 is an enlarged cross-sectional view illustrating main portions of a dial 20 of a Comparative Example.

As illustrated in FIG. 8, the dial 20 of the Comparative Example is provided with a substrate 21 and a metal film 22.

The substrate 21 includes a first surface 211 and a second surface 212, and was formed from polycarbonate having a thickness of 500 μm and a diameter of 30 mm. Then, the metal film was layered on the first surface 211 of the substrate 21. The metal film 22 was formed by layering an Ag layer having a thickness of 120 nm and an $SiO_2$ layer having a thickness of 100 nm.

A plurality of through holes 223 penetrating from the front surface 221 of the metal film 22 to the rear surface 222 were formed by a known etching process. At this time, a number of the through holes 223 required such that the transmittance of light became 30% was determined through pre-testing, and the determined number of through holes 223 was formed.

Note that recessed portions, such as those in Example 1 to Example 3 described above, are not formed in the substrate 21 of the character board 20 of the Comparative Example.

Evaluation Tests

The following evaluation tests were performed on the dials of Example 1 to Example 3 and on the dial 20 of the Comparative Example.

Confirmation Test for Interference Fringe Reduction Effect

A visual test stipulated in "JIS Z 8720", for example, was performed with respect to the dials of Example 1 to Example and the dial 20 of the Comparative Example, and an interference fringe reduction effect was evaluated.

Evaluation criteria were "A" for significant improvement, "B" for improvement, and "C" for no improvement in the interference fringe reduction effect with respect to the dial 20 of the Comparative Example.

Confirmation Test for Panel Transmittance Reduction Effect

The visual test stipulated in, "JIS Z 8720", for example, was performed with respect to the dials of Example 1 to Example 3 and the dial 20 of the Comparative Example, and an evaluation as to how difficult it was to see the solar cell 50 when viewed from the front side of the dial was used as a panel transmittance reduction effect.

Evaluation criteria were "A" for significant improvement, "B" for improvement, and "C" for no improvement in the panel transmittance reduction effect with respect to the dial 20 of the Comparative Example.

Opening Ratio Evaluation

Opening ratios of the dials of Example 1 to Example 3 and the dial 20 of the Comparative Example were calculated. Specifically, a ratio of a total through hole area with respect to an area of the surface of the dial was calculated as a percentage. Note that, as described above, in the dials of Example 1 to Example 3 and the dial 20 of the Comparative Example, the through holes are formed so that the transmittance of light is 30%.

Results of Confirmation Test for Interference Fringe Reduction Effect

FIG. 9 is a diagram showing results of the evaluation tests.

As shown in FIG. 9, the result of the confirmation test for the interference fringe reduction effect is "A" for the dials of Example 1 and Example 3, indicating that the interference fringe reduction effect is significantly improved with respect to the dial 20 of the Comparative Example. Further, the result is "B" for the dial of Example 2, indicating that the interference fringe reduction effect is improved with respect to the dial 20 of the Comparative Example. This suggests that by providing the recessed portions in the positions corresponding to the through holes, the interference fringe can be reduced. Furthermore, the results suggest that the interference fringe can be further reduced by providing the convex portions at the opening end portions of the through holes and increasing the arithmetic average roughness Ra of the bottom surfaces of the recessed portions.

Results of Confirmation Test for Panel Transmittance Reduction Effect

The result of the confirmation test for the panel transmittance reduction effect is "A" for the dial of Example 3, indicating that the panel transmittance reduction effect is significantly improved with respect to the dial 20 of the Comparative Example. Further, the result is "B" for the dials of Example 1 and Example 2, indicating that the panel transmittance reduction effect is improved with respect to the dial 20 of the Comparative Example. This suggests that the panel transmittance can be reduced by providing the recessed portions in the positions corresponding to the through holes. In particular, the results suggest that increasing the arithmetic average roughness Ra of the bottom surfaces of the recessed portions, as in Example 3, is effective to reduce panel transmittance.

Opening Ratio Evaluation

The result of the opening ratio evaluation is 24.0% for the dials of Example 1 and Example 2 and for the dial 20 of the Comparative Example, and 23.4% for the dial of Example 3. In other words, the results suggest that the dial of Example 3 can achieve the predetermined transmittance with a smaller opening ratio compared to the other Examples and the Comparative Example. This suggests that by increasing the arithmetic average roughness Ra of the bottom surfaces, the area of the through holes can be reduced.

Modified Example

Note that the present disclosure is not limited to each of the embodiments described above, and variations, modifications, and the like within the scope in which the object of the present disclosure can be achieved are included in the present disclosure.

In each of the embodiments described above, the watch component of the present disclosure is configured as the dials 10, 10A, and 10B, but are not limited thereto. For example, the watch component of the present disclosure may be configured as a partition plate.

In the first embodiment described above, the die cutting is performed after the laser processing, but no such limitation is intended, and, for example, the die cutting may be performed after performing coating following the laser processing.

Similarly, in the second embodiment described above, the die cutting is performed after the ion milling, but no such limitation is intended, and, for example, the die cutting may be performed after performing the coating following the ion milling.

Furthermore, in a similar manner, in the third embodiment described above, the die cutting is performed after the blasting, but no such limitation is intended, and, for example, the die cutting may be performed after performing the coating following the blasting.

What is claimed is:

1. A watch component comprising:

a base material having light-transmissivity, the base material including a plurality of recessed portions and a convex portion that surrounds an opening end portion of each of the recessed portions; and a metal film layered at the base material and including a plurality of through holes provided in positions corresponding to the plurality of recessed portions.

2. The watch component according to claim 1, wherein a bottom surface of the recessed portion is formed in a curved surface shape.

3. The watch component according to claim 1, wherein a bottom surface of the recessed portion is a rough surface.

4. The watch component according to claim 2, wherein the bottom surface of the recessed portion is a rough surface.

5. The watch component according to claim 3, wherein the recessed portion is formed such that the bottom surface thereof is a rough surface having an arithmetic average roughness Ra that is greater than 0.01 μm and less than 0.5 μm.

6. The watch component according to claim 4, wherein the recessed portion is formed such that the bottom surface thereof is a rough surface having an arithmetic average roughness Ra that is greater than 0.01 μm and less than 0.5 μm.

7. A watch comprising:

a case;

a watch component disposed inside the case and including a base material having light-transmissivity, the base material including a plurality of recessed portions and a convex portion that surrounds an opening end portion of each of the recessed portions, and a metal film layered at the base material and provided with a plurality of through holes provided in positions corresponding to the plurality of recessed portions; and a solar cell which is disposed inside the case at an opposite side of the base material from a surface having the metal film layered thereon, and at which light passing through the plurality of recessed portions and the plurality of through holes is incident.

8. The watch according to claim 7, wherein a bottom surface of the recessed portion is formed in a curved surface shape.

9. The watch according to claim 8, wherein a bottom surface of the recessed portion is a rough surface.

10. The watch according to claim 8, wherein the recessed portion is formed such that the bottom surface thereof is a rough surface having an arithmetic average roughness Ra that is greater than 0.01 μm and less than 0.5 μm.

* * * * *